United States Patent [19]

Currie

[11] 4,305,442

[45] Dec. 15, 1981

[54] SAW INCLUDING RESILIENTLY MOUNTED FLEXIBLE GUARD MEANS

[76] Inventor: Bruce Currie, Elm St., Lambertville, N.J. 08530

[21] Appl. No.: 138,787

[22] Filed: Apr. 9, 1980

Related U.S. Application Data

[63] Continuation-in-part of Ser. No. 25,125, Mar. 29, 1979, abandoned.

[51] Int. Cl.$^3$ .............................................. B27B 21/00
[52] U.S. Cl. .................................... 145/35 D; 30/151
[58] Field of Search ........................ 145/35 D; 30/151

[56] References Cited

U.S. PATENT DOCUMENTS

| 1,085,499 | 1/1914 | Shapiro | 145/35 D |
| 2,954,118 | 9/1960 | Anderson | 145/35 D |
| 3,129,731 | 4/1964 | Tyrrell | 145/35 D |

*Primary Examiner*—Nicholas P. Godici
*Assistant Examiner*—J. T. Zatarga
*Attorney, Agent, or Firm*—John J. Kane; Frederick A. Zoda; Albert Sperry

[57] ABSTRACT

A saw handle adapted to have a blade engaged therewith and further including a gripping area to allow a user to firmly hold the saw handle, the saw further including a flexible guard member which is movably secured to the saw handle adjacent to the blade such that the flexible guard is movable to extend along the toothed edge of the saw blade to be attachable thereto for protection of the teeth of the saw blade as well as for protection of the surrounding environment from the teeth of the saw blade, the flexible guard being secured to the handle by way of a resilient retaining member such as a spirally wound recoil spring which will wind the flexible guard means automatically in a circular fashion within the handle whenever the guard itself is not being pulled outwardly for placement adjacent the toothed edge of the blade, the handle defining a recess into which the flexible guard and the resilient retaining member are located, the flexible guard possibly further including a hook eye adapted to slide into a slot defined by the blade at the forward edge thereof to hold the guard in fixed engagement with respect to the teeth of the blade, in this manner the automatically recoiling flexible blade guard will be retained in a somewhat remote location whenever the saw is in normal use and will be able to be withdrawn from the recess and placed in engagement with the teeth of the blade easily and quickly, the blade also preferably including a knife area for starting cuts as defined by the blade member.

4 Claims, 5 Drawing Figures

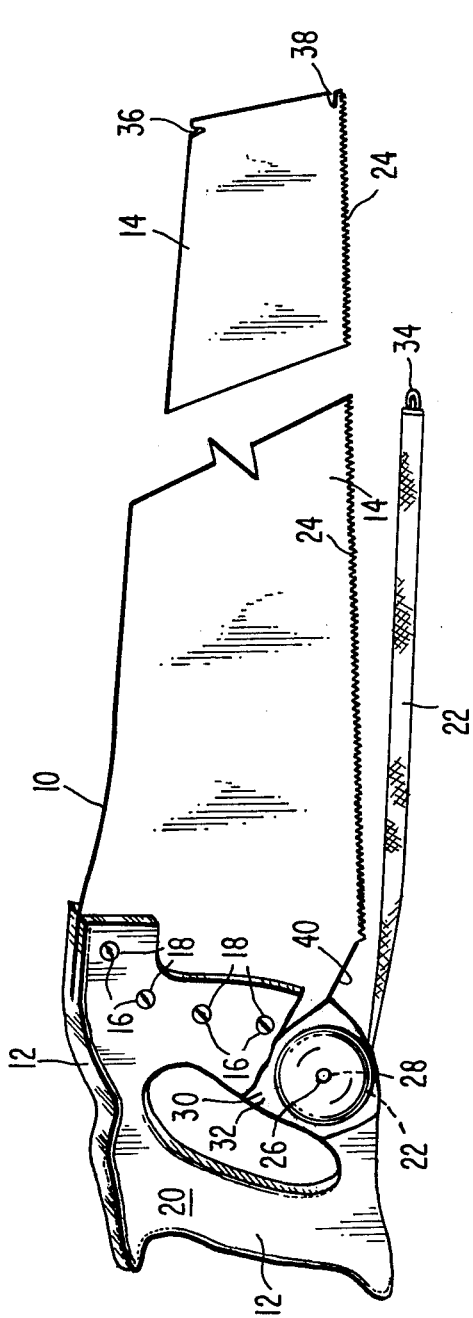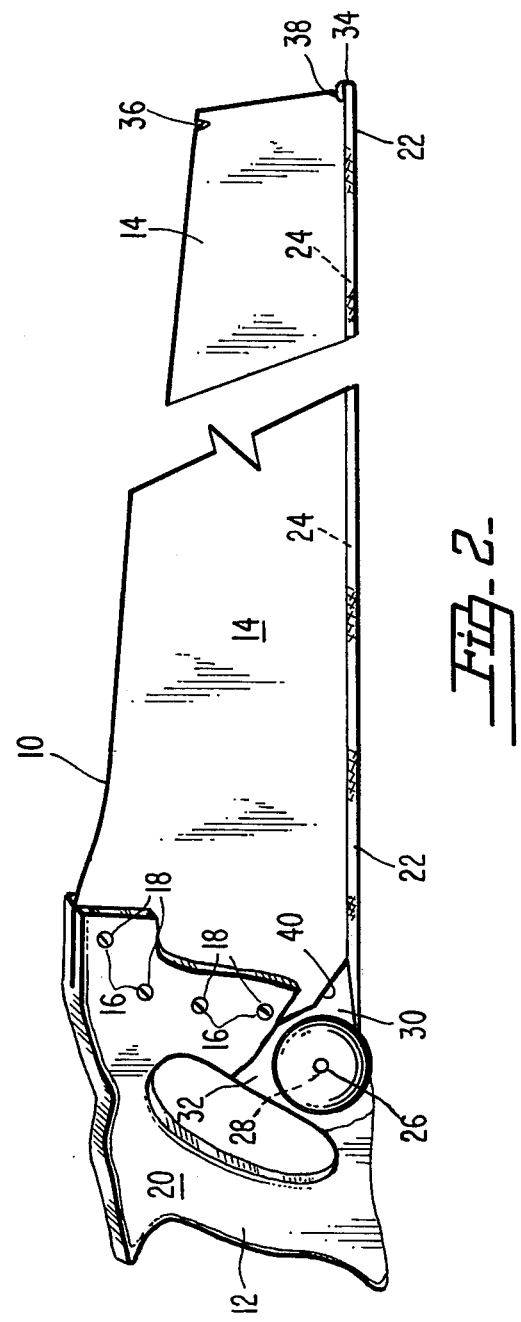

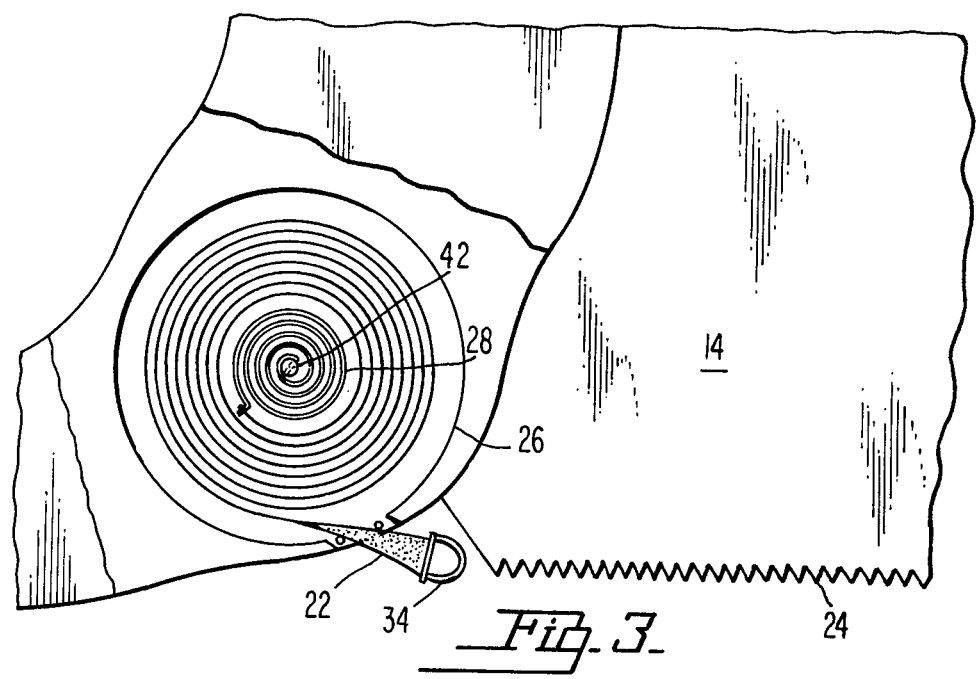
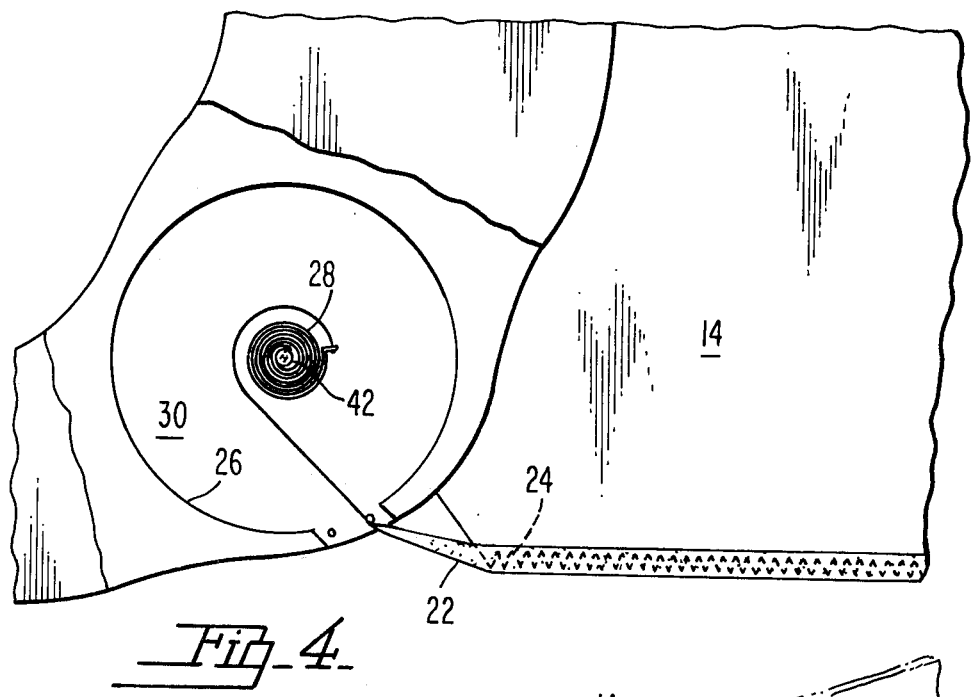
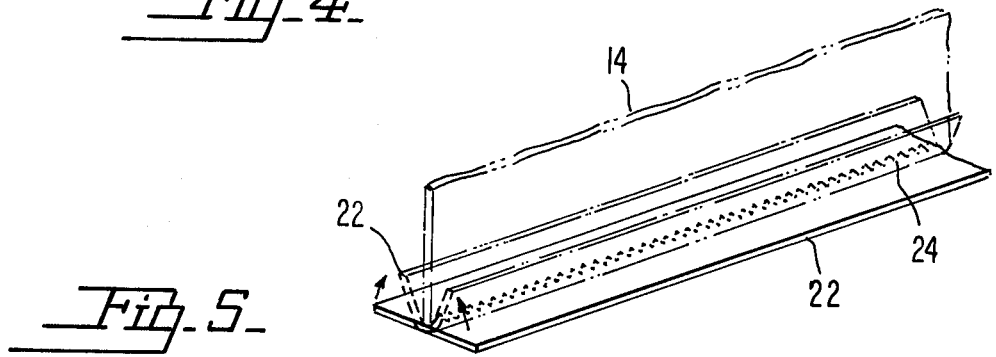

SAW INCLUDING RESILIENTLY MOUNTED FLEXIBLE GUARD MEANS

This application is a continuation-in-part of U.S. Ser. No. 025,125 filed Mar. 29, 1979, now abandoned.

BACKGROUND OF THE INVENTION

1. Field of the Invention

This present invention relates to guards for use with handles usable with hand saws including a variety of different types of carpenter saws, metal cutting saws, wood cutting saws, crosscut saws and the like. The present invention is particularly adaptable for use with conventionally configured carpenter's hand saw handles.

The teeth of such saws are highly susceptible to damage upon contacting materials for which the saw has not been designed. The result is that the teeth will become dull or broken and a costly resharpening is required. Also, on the other hand, it is a common occurrence for objects with which the saw may have inadvertently come in contact may become marred or scratched by such contact. In order to prevent damage to both the saw and the surrounding environment it is preferable to include a guard means for protecting the teeth from unwanted contact with various articles.

2. Description of the Prior Art

Various articles have been utilized in the past to protect the teeth of saws from contact with other objects including a variety of types of guards and longitudinally extending protecting members. One example of such a design is U.S. Pat. No. 2,954,118 which discloses a guard protecting the cutting edges of saw blades wherein a flexible protecting member is shown. This design merely would ®provide a predetermined length of the protecting member which is not in any way secured to the handle of the saw itself. Another configuration is shown in U.S. Pat. No. 3,417,797 for a hand saw guard wherein another similar predetermined section of guard is shown. Another similar Patent is U.S. Pat. No. 2,761,477 issued to C. A. Sherman on a saw guard.

More pertinent is U.S. Pat. No. 1,085,499 disclosing a hand saw which includes a segmented protecting member. This segmented protecting member is adapted to collapse and is capable of being urged within a pocket within the handle of the saw. This design does not provide the continually flexible guard means of the present invention.

Also various means for including starter knives in the blades of saws are shown in U.S. Pat. Nos. 4,034,367; 3,837,024; 2,853,106 and 2,780,256.

The present design as a whole is distinguishable from each of the above cited references.

SUMMARY OF THE INVENTION

The present invention includes a saw handle for use with a saw blade including a blade engagement means which is adapted to fasten the blade to the handle. This blade engagement means preferably will take the form of a plurality of blade bolts. The saw handle also defines a gripping means in a conventional manner to allow a user to firmly hold the saw handle and guide the saw blade during sawing.

The saw handle will preferably define a recess therein perhaps in the form of a slot in which will be located a flexible guard means and a resilient retaining means.

The resilient retaining means will be fixedly secured to the saw handle within the recess and will be also fixedly secured to the flexible guard means. The resilient retaining means preferably will take the form of a spirally wound recoil spring similar to the type of configuration normally found within a conventional tape measuring instrument. In this manner the flexible guard means may be spirally wound about the resilient retaining means to thereby be movably secured with respect to the saw handle. The recess is normally positioned adjacent the blade engagement means and hence adjacent the blade to allow the flexible guard means to be pulled outwardly by exerting an outwardly directed bias thereto to extend along the toothed edge of the saw blade to be detachably secured thereto. In this manner the teeth of the blade will be protected and the surrounding environment will be protected from being damaged by the teeth of the blade. To facilitate securement to the toothed edge of the blade the flexible guard means may include a hook eye means at the end thereof adapted to be secured to a slot defined at the front edge of the saw blade. The blade of the present invention may also include a starter knife edge defined by the blade area to facilitate the starting of cuts.

It is an object of the present invention to provide a guard for the toothed edge of a saw blade by which complete protection will be achieved of the cutting edge of the blade to assure sharpness and accuracy of the blade when utilized.

It is an object of the present invention to provide a guard for saw teeth which may be readily placed in position and quickly removed.

It is an object of the present invention to provide a guard for the protection of the teeth of a saw blade wherein the guard may be simply and automatically retained within the handle by being connected to a resilient recoiling spring.

It is an object of the present invention to make a saw guard which is reasonable in cost and easy to make, wherein the use and practicality will encourage utilization throughout the industry.

It is an object of the present invention to provide a saw guard blade that will retain a guard in position upon the blade itself and prevent the guard from dropping off.

It is an object of the present invention to provide a guard for the teeth of a conventional saw blade which protects the surrounding environment also from damage directed by the teeth.

It is an object of the present invention to provide a novel saw blade which includes a knife edge area for starting of cuts.

It is an object of the present invention to provide a saw handle which can be used with a variety of types of saw blade configurations which include therein a saw blade guard which is usable with each of these saw blade configurations.

It is an object of the present invention to provide a saw blade guard which automatically recoils into a recess within the handle when released.

It is an object of the present invention to provide a saw blade guard which includes a securing means in a form of a slot and hook to help hold the guard in abutment with the toothed edge of the blade.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view of an embodiment of the saw handle of the present invention showing the guard in the process of being pulled out; and FIG. 2 shows an illustration of an embodiment of the configuration shown in FIG. 1 wherein the flexible guard means has been placed in position in contact with the toothed edge of the saw blade; and FIG. 3 is a cross-sectional view of an embodiment of the flexible guard shown in the contracted position;

FIG. 4 is a cross-sectional view of an embodiment of the flexible guard shown in the withdrawn position in place on the blade teeth; and FIG. 5 is a cross-sectional view of an embodiment of the blade engagement means of the present invention shown in position over the saw blade.

DETAILED DESCRIPTION OF THE PREFERRED EMBODIMENT

A saw 10 of the present invention preferably includes a saw handle 12 as well as a saw blade 14. The saw handle 12 includes a blade engagement means 16 therein to facilitate the securement of the saw blade 14 to the saw handle 12. This blade engagement means 16 preferably will take the form of a plurality of blade bolts 18.

The saw handle 12 will include an area in the rear thereof such as a gripping means 20 to allow easy grasping of the saw handle 12 by a user. The handle 12 also defines a guard recess 30 therein such as a guard slot 32 in which is located the flexible guard means 22.

Flexible guard means 22 is preferably positioned within the guard recess 30 located adjacent the blade engagement means 16 such that the flexible guard means 22 is near to the toothed edge 24 of blade 14.

The flexible guard means 22 is actually secured to a resilient retaining means 26, which itself is secured to the handle 12 at a location within the guard recess 30. The resilient retaining means 26 preferably takes the form of a spirally wound recoil spring 28. The resilient retaining means 26 is configured to resiliently retain the flexible guard means 22 within the slot or recess 30 if the user has not pulled the flexible guard means 22 outward therefrom. As shown in the configuration of FIG. 3 a flat spring wound spirally around a center core 42 is most easily adapted for this purpose. The end of the spiral spring is then secured to the end of the flexible guard means 22 opposite from the end where the hook eye member 34 is secured to allow the guard member to be wrapped spirally within the recess 30 about the spring 28 when the resilient retaining means pulls it inwardly. Therefore it is necessary that the material of the guard means 22 be continuously flexible. This flexibility allows the guard to be wrapped by the resilient retaining means within the recess as shown in FIG. 3. The cross-sectional shape of the flexible guard means can be of any of chosen configuration such as shown in FIG. 5 such that it can be wrapped spirally within the recess by the resilient retaining means and also it will adhere to the lower surface of the toothed edge of the saw blade. For example, the guard means 22 could be of a flat rubber material or other flexible material having a high coefficient of friction such that when a hook 34 is used it will contact the saw teeth and be retained in position by the hook being located within the blade slot 38 in view of the bias exerted by the spirally wound recoil spring 28. Alternatively, the cross-section of the flexible guard means could be U-shaped or V-shaped to more closely fit around the lateral side of the blade adjacent the teeth. In this manner a more fixed securement when the guard is in place on the teeth would be achievable. Some means may be provided for holding the guard in contact with the teeth of the blade and preventing it from being pulled backwardly into the recess by a spirally wound recoil spring 28. This holding can be performed in many ways including the usage of a hook 34 and slot 38 or a U-shaped flexible guide means which closely holds the teeth on opposite sides thereof while also is flexible enough to be wound spirally within the recess. In this manner the flexible guard means 22 will be movable in a similar fashion to a conventional tape measuring instrument since the guard 22 can be pulled outwardly and when released will automatically be wound by the resilient retaining means 26.

Therefore, after using the saw 10 and it is desired by the user to store the saw the end of the flexible guard means 22 will be gripped by the user and will be pulled outwardly. The flexible guard means will then be placed in abutment to the toothed edge 24 of the balde 14 and in this manner both the teeth of the saw and the surrounding environment will be protected. If it is again desired to use the saw 10 then the guard means can be removed and simply released and the spirally wound recoil spring 28 will spirally wind the flexible guard means 22 within the recess 30.

To facilitate engagement between the flexible guard means 22 and the toothed edge 24 a hook eye member 34 may be included on the guard means 22. This member 34 will be adapted to be slid within upper blade slot 36 or lower blade slot 38 preferably located at the forward edge of the saw blade 14 and in this manner firm securement between the blade 24 and the guard means 22 will be assured. The saw blade 14 of the present invention may also include a knife means 40 to facilitate the intitiation of cuts if desired.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A saw handle attachable to a saw blade having a toothed edge, said saw handle comprising:
    (a) a handle means;
    (b) means for attaching a saw blade to said handle means being located along an edge of said handle means;
    (c) a gripping means located along another edge of said handle means to allow a user to firmly hold said handle means;
    (d) a spirally wound recoil spring being fixedly secured at one end thereof to said handle means; and
    (e) a continuously flexible guard means being elongated with one end connected to the other end of said spirally wound recoil spring and being wound around said spirally wound recoil spring in the withdrawn position and extendable therefrom to cover the saw blade toothed edge.

2. The handle as defined in claim 1 wherein said means for attaching a saw blade comprises a plurality of blade bolts extending through the saw handle and the saw blade.

3. The handle as defined in claim 1 wherein the saw handle defines a guard recess therein in which said flexible guard means and said spirally wound recoil spring are retained.

4. The handle as defined in claim 1 wherein said flexible guard means includes a hook eye member thereon securable to a slot on the saw blade to maintain said flexible guard means in the extended position in engagement with the toothed edge of the saw blade.

* * * * *